United States Patent
Wu

(10) Patent No.: US 7,500,027 B2
(45) Date of Patent: Mar. 3, 2009

(54) EMULATION OF A DISCONNECT OF A DEVICE

(75) Inventor: Zong Liang Wu, Brussels (BE)

(73) Assignee: NXP B.V., Eindhoven (NL)

( * ) Notice: Subject to any disclaimer, the term of this patent is extended or adjusted under 35 U.S.C. 154(b) by 198 days.

(21) Appl. No.: 10/919,756

(22) Filed: Aug. 17, 2004

(65) Prior Publication Data

US 2005/0066087 A1    Mar. 24, 2005

(51) Int. Cl.
*G06F 3/00* (2006.01)
(52) U.S. Cl. .................................................... 710/15
(58) Field of Classification Search ............... 370/257, 370/438; 710/8, 15, 62
See application file for complete search history.

(56) References Cited

U.S. PATENT DOCUMENTS 6,061,754 A * 5/2000 Cepulis et al. .............. 710/312
6,593,768 B1 * 7/2003 Iyer et al. ..................... 326/30

* cited by examiner

*Primary Examiner*—Kim Huynh
*Assistant Examiner*—Jasjit S Vidwan

(57) ABSTRACT

USB 2.0 supports communication in low-speed (LS), full speed (FS) and high speed (HS). In the full speed mode, the wire segment between a hub and a device is terminated via a pull-up resistor 480 on the D+ data line on the downstream end of the segment. In the high-speed mode, both signal wires are terminated by the LS/FS driver 420 generating a single-ended zero via resistors 490. The device emulates a disconnect, while it operates in the high-speed mode, by activating the pull-up resistor 480. Including the D+ pull-up resistor is practically equivalent to an open end, enabling a reliable disconnect detection in the hub using the disconnection envelop detector 460. Detection of an (emulated) disconnect, triggers the reset en enumeration process. This allows the device to report a change in functionality without the user having to physically remove the device from the bus.

9 Claims, 3 Drawing Sheets

EMULATION OF A DISCONNECT OF A DEVICE

The invention relates to emulation of a disconnect of a device (node) in a plug-and-play communication system.

The Universal Serial Bus (USB) is a host-centric plug-and-play bus. The logical USB bus connects USB devices with the USB host, using a physical tiered star topology. The system has one host with a hub at the center of each star. Hubs convert a single attachment point (port) into multiple attachment points. The upstream port of a hub connects the hub towards the host. Each of the downstream ports of a hub allows connection to another hub or a function. Hubs can detect attach and detach at each downstream port. Each wire segment is a point-to-point connection between the host and a hub or function, or a hub connected to another hub or function. A function is a USB device that is able to transmit or receive data or control information over the bus and as such provides capabilities to the system. Examples of functions include locator devices, such as a mouse, tablet, or light pen, input devices, such as a keyboard or a scanner, output devices, such as a printer or digital speakers, and a telephony adapter. Each function contains configuration information that describes its capabilities and resource requirements. Before a function can be used, the host must configure it. This configuration includes allocating USB bandwidth and selecting function-specific configuration options.

The USB transfers signals over two wires indicated by D+ and D− on each point-to-point segment. The USB core specification 1.0, 1.1 defines a Low-Speed and a Full-Speed mode, operating at a respective bitrate of 1.5 Mb/s and 12 Mb/s. In order to provide guaranteed input voltage levels and proper termination impedance, biased terminations are used at each end of the cable. The terminations also permit the detection of attach and detach at each port and differentiate between full-speed and low-speed devices by the position of the pull-up resistor on the downstream end of the cable:

Full-speed (FS) devices are terminated with the pull-up resistor on the D+ line;
Low-speed (LS) devices are terminated with the pull-up resistor on the D− line.

USB devices may attach to and detach from the USB at any time. Consequently, system software must accommodate dynamic changes in the physical bus topology. Bus enumeration is the activity that identifies and assigns unique addresses to devices attached to a bus. Bus enumeration also includes the detection and processing of removals. Hubs have status indicators that indicate the attachment or removal of a USB device on one of its ports. The host queries the hub to retrieve these indicators In the case of an attachment, the host enables the port and addresses the USB device through the device's control pipe at the default address. The host assigns a unique USB address to the device and then determines if the newly attached USB device is a hub or a function. If the attached USB device is a hub and USB devices are attached to its ports, then the above procedure is followed for each of the attached USB devices. If the attached USB device is a function, then attachment notifications will be handled by host software that is appropriate for the function.

The signaling of a connect and disconnect of a function, is as follows. When no function is attached to the downstream port of the host or hub, the pull-down resistors present there will cause both D+ and D− to be pulled below the single-ended low threshold of the host or hub port when that port is not being driven by the hub. The detection of a new connect or a disconnect is done by checking the D+ and D− state for both FS and LS device. When there is no connect, the receiver of the hub's downstream-facing port sees single-ended zero SE0 (i.e. D+=D−<threshold, i.e. logic 0). When an FS device is connected, the receiver sees a transition of D+ from logic 0 to logic 1, while D− remains at logic 0. The corresponding idle state of the bus is D+=1 and D−=0. In a similar way, when a LS device is connected, the receiver sees a transition of D− from logic 0 to logic 1, while D+ remains at logic 0. The corresponding idle state of the bus is D−=1 and D+=0. In case of a disconnect, the receiver of the hub's downstream-facing port (where the device was connected) sees a bus state transition from (D+,D−)=(1,0) for an FS device and (D+,D−)=(0,1) for an LS device to (D+,D−)=(0,0) for both an HS and LS device. A disconnect condition (TDDIS) is indicated if the host or hub is not driving the data lines and an SE0 persists on a downstream port for more than 2.5 s. A connect condition (TDCNN) will be detected when the hub detects that one of the data lines is pulled above its VIH threshold for more than 2.5 s.

As described above, the host initiates the enumeration process. The USB specifications do not define a way by which a device can request the host to reset and re-enumerate the device. However in some applications this re-enumeration is needed, for example due to the change of the functionality of the device. The most straightforward way to achieve this re-enumeration is by first disconnecting the device, and then connecting it back again to the hub's downstream-facing port. However, for some applications, it is desired or even needed to be able to emulate this disconnect-then-connect-again process through device's firmware control, instead of through manual intervention. The emulation can be done by electronically switching the pull-up resistor that is attached to the D+ line (for a FS device) or D− line (for a LS device) first off (i.e. disabling the termination), followed by switching it on.

The USB 2.0 specification defines a High-Speed (HS) device operating at around 480 Mb/s. The HS device is in addition to the low-speed and full-speed devices. For a HS device, the termination for normal operation is changed from single data line pull-up to a parallel termination. When a HS device is connected to a hub's downstream-facing port, the device always has its D+ pull-up resistor on, just as an FS device, and the detection of a new connect is done in the same way as for a FS device. The hub will reset this new device, and the device will switch to parallel termination after having gone through a predefined 'chirping' process during the reset period. In normal HS operation, the parallel termination is used, and the corresponding idle state is SE0. There is thus no distinction between the idle state and the disconnect state, both being at SE0. The following mechanism is defined for HS device disconnect detection: if the device is disconnected, then a constant signal transmitted by the hub's transmitter to the device will be reflected back, and the hub's receiver will see a differential signal amplitude exceeding the maximum allowable data signal level after a delay of a round-trip time of the cable. This excess signal level is used to reliably detect disconnect.

It is an object of the invention to emulate a disconnect of the device at the same downstream-facing port, where the emulation can be performed in a firmware controlled way, without manual intervention.

To meet the object of the invention, the plug-and-play communication system, includes a device connected via a wire segment to a further device/hub; the system supporting communication in at least a first speed mode (FS) and a second, higher speed mode (HS); the device including for each respective one of the speed modes a respective first and second means of terminating the wire segment; the device being operative to emulate disconnecting the device, while operating in the second speed mode, by activating the first means of terminating the wire segment. By activating the first means of termination, possibly in addition to the existing second means of termination, the termination for communication within the second mode no longer complies with the requirements. The deviation can be detected by the further device or hub connected to the other end of the segment. By using the first means of termination, which is any how present in the dual-mode device, the deviation in the termination is achieved in a simple way. With the phrase 'further device/ hub' is meant the node connected at the other end of the segment. In USB, this node is called a hub. In other systems, such a node may functionally be the same as a device.

In an embodiment, the device (or hub) at the other end of the segment detects that the termination exceeds the limit for the second mode communication, and starts a reconnect process to determine whether a new or the same device has been connected and at which speed the device can operate.

In an embodiment, the second mode termination is disabled, bringing the termination of the device into the limits for the first speed mode, allowing a well-defined and good starting point for the reconnect process.

In an embodiment, for a USB FS device the termination for the first speed mode (FS) is an impedance, such as pull-up resistor coupled between one the data wires and a supply voltage. A controllable switch is preferably used to enable/ disable the coupling of the resistor. Including the D+ pull-up is practically equivalent to an open end, allowing for a reliably detection of a disconnect.

In an embodiment, for a USB HS device the termination for the second speed mode (HS) is obtained by having the FS driver generate a SE0 signal via two matching resistors. Disabling the termination can be achieved by disabling the driver.

The object of the invention is achieved by providing a device for use in a plug-and-play communication system, where the device is connectable via a wire segment to a further device/hub; the system supporting communication in at least a first speed mode and a second, higher speed mode; the device including for each respective one of the speed modes a respective first and second means of terminating the wire segment; the device being operative to emulate disconnecting the device, while operating in the second speed mode, by activating the first means of terminating the wire segment.

The object of the invention is also achieved by providing a method of emulating disconnecting a device in a plug-and-play communication system, where the device is connected via a wire segment to a further device/hub; the system supporting communication in at least a first speed mode and a second, higher speed mode; the device including for each respective one of the speed modes a respective first and second means of terminating the wire segment; the method including emulating disconnecting the device, while operating in the second speed mode, by activating the first means of terminating the wire segment.

These and other aspects of the invention will be apparent from and elucidated with reference to the embodiments shown in the drawings.

Figure 1:
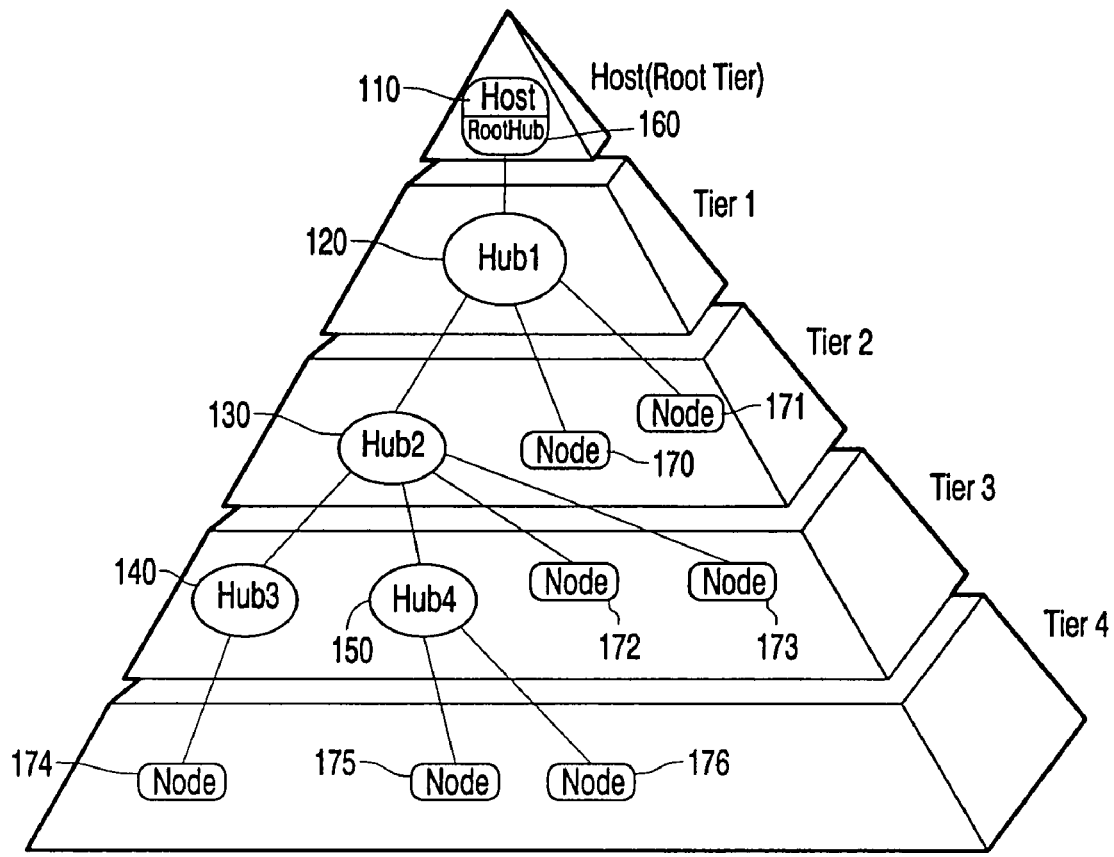
FIG. 1 shows a communication system with a hierarchical star topology.

FIG. 1 shows a plug-and-play communication system according to the invention. The invention will be described in detail for the USB bus. It will be appreciated that many variations lie within the skills of a person skilled in the art. For instance, a reference is made to the signal levels and types of termination within USB. The same principles for emulating a disconnect and triggering a reconnect may equally well be used for other signal levels and other types of terminations. The shown Universal Serial Bus (USB) is a host-centric plug-and-play bus. The logical USB bus connects USB devices with the USB host, using a physical tiered star topology. The communication system includes one host 110 and hubs 110, 120, 130, 140, 150 at the center of each star. A root hub 160 is integrated within the host system. The upstream port of a hub connects the hub towards the host. Each of the downstream ports of a hub allows connection to another hub or a function. Each wire segment is a point-to-point connection between the host and a hub or function, or a hub connected to another hub or function. A function 170, 171, 172, 173, 174, 175, 176 is a USB device that is able to transmit or receive data or control information over the bus and as such provides capabilities to the system. A function is typically implemented as a separate peripheral device with a cable that plugs into a port on a hub. However, a physical package may implement multiple functions and an embedded hub with a single USB cable. This is known as a compound device. A compound device appears to the host as a hub with one or more non-removable USB devices. Each function contains configuration information that describes its capabilities and resource requirements. Before a function can be used, the host must configure it. This configuration includes allocating USB bandwidth and selecting function-specific configuration options.

Figure 2:
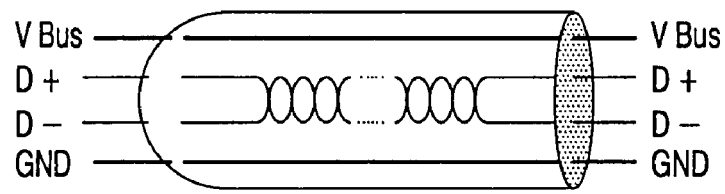
FIG. 2 illustrates use of signaling wires.
Figure 3A:
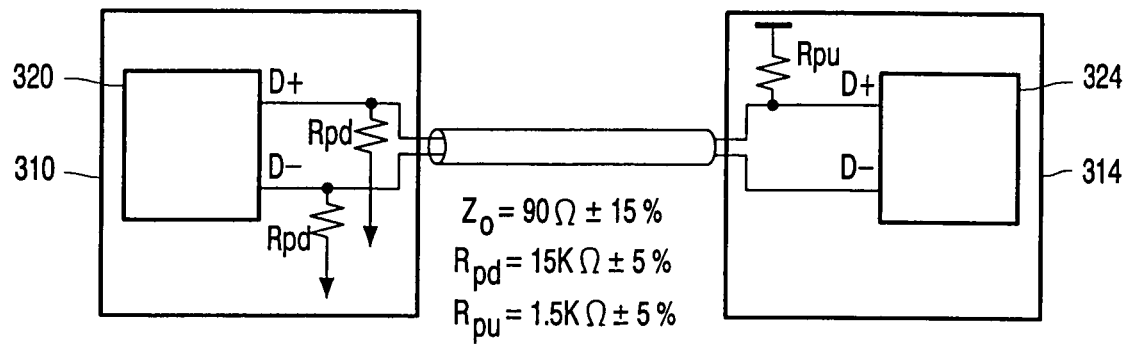
FIG. 3 shows a location of the pull-up resistor for full-speed and low-speed transceivers, respectively.
Figure 3B:
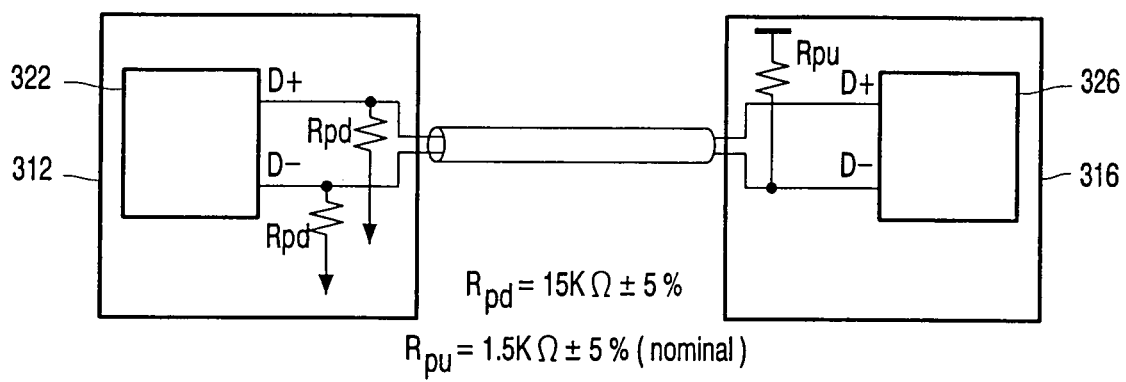

The USB transfers signal and power over a four-wire cable, shown in FIG. 2. The signaling occurs over two wires indicated by D+ and D− on each point-to-point segment. The USB core specification 1.0, 1.1 defines a Low-Speed and a Full-Speed mode, operating at a respective bitrate of 1.5 Mb/s and 12 Mb/s. The clock is transmitted, encoded along with the differential data. The clock-encoding scheme is NRZI with bit stuffing to ensure adequate transitions. A SYNC field precedes each packet to allow the receiver(s) to synchronize their bit recovery clocks. The cable also carries VBus and GND wires on each segment to deliver power to devices. In order to provide guaranteed input voltage levels and proper termination impedance, biased terminations are used at each end of the cable. The terminations also permit the detection of attach and detach at each port and differentiate between full-speed and low-speed devices. USB full-speed and low-speed devices are terminated at the hub and function ends as shown in FIGS. 3A and 3B, respectively. Full-speed and low-speed devices are differentiated by the position of the pull-up resistor on the downstream end of the cable:

Full-speed devices are terminated as shown in FIG. 3A with the pull-up resistor $R_{pu}$ on the D+ line;

Low-speed devices are terminated as shown in FIG. 3B with the pull-up resistor $R_{pu}$ on the D− line.

In FIGS. 3A and 3B, the ports 310, 312 to the left (in a hierarchically higher tier) is either a hub or a host port. The high-speed port 314 to the right in FIG. 3A is either a hub upstream port or a full-speed function. The low-speed port 316 to the right in FIG. 3B is a low-speed function (in USB an upstream port of a hub may not operate at low speed). The transceivers 320 and 322 are capable of operating both at the high-speed and the low-speed. Transceiver 324 is a high-speed transceiver. Transceiver 326 is a low-speed transceiver. $R_{pd}$ indicates the pull-down resistors in the downstream ports, connected to ground.

Figure 4:
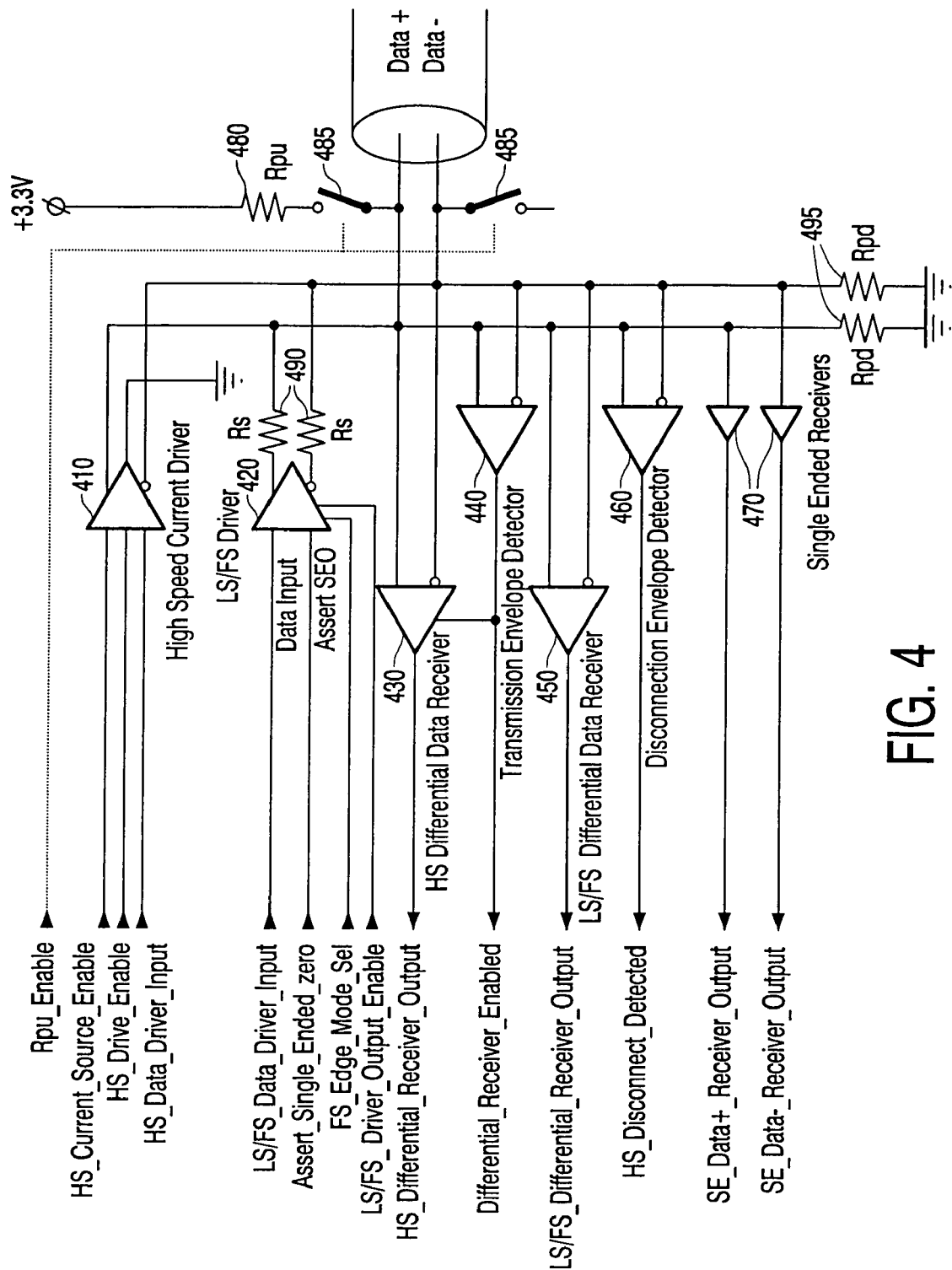
FIG. 4 shows a block diagram of a high-speed transceiver.

FIG. 4 illustrates a preferred implementation of the USB 2.0 High Speed transceiver, which largely utilizes USB 1.1 transceiver elements and adds the new elements required for HS operation. High speed operation supports signaling at 480

Mb/s. To achieve reliable signaling at this rate, the cable is terminated at each end with a resistance from each wire to ground. The value of this resistance (on each wire) is nominally set to ½ the specified differential impedance of the cable, or 45 Ohms. This presents a differential termination of 90 Ohms. The quiescent state of a transceiver which is operating in HS mode is the terminated state with no signal applied to the Data+ and Data− lines. The recommended means to achieve this state is to use the LS/FS mode driver to assert a single ended zero (SE0), and to closely control the combined total of the driver output impedance and the Rs resistance 490 (to 45 Ohms, nominal). The recommended practice is to make the driver impedance as low as possible, and to let Rs 490 contribute as much of the 45 Ohms as possible. This will generally lead to the best termination accuracy with the least parasitic loading.

In order to transmit, a transceiver activates an internal current source that is derived from its positive supply voltage and directs this current into one of the two data lines via a high speed current steering switch. The dynamic switching of this current into the Data+ or Data− line follows the NRZI data encoding scheme described in the USB 1.1 specification, including the bit stuffing behavior. To signal a J the current is directed into the Data+ line, and to signal a K the current is directed into the Data line. The SYNC field and the EOP delimiters have been modified for HS mode.

Referring to FIG. 4, an LS/FS Driver 420 is used for LS and FS transmission according to the USB 1.0/1.1 specification for LS and FS operation, with the exception that in a HS capable transceiver the impedance of each output, including the contribution of Rs, must be 45 Ohms +/−10%. When the transceiver is operating in HS mode, this driver must assert a SE0. This provides a well-controlled HS termination on each data line of 45 Ohms to ground.

A HS Current Driver 410 is used for HS data transmission. A current source derived from a positive supply is switched into either the Data+ or Data− lines to signal a J or a K, respectively. The nominal value of the current source is 17.78 mA. When this current is applied to a data line with a 45 Ohm termination to ground at each end, the nominal high level voltage is +400 mV. The nominal differential HS voltage (Data+−Data−) is thus 400 mV for a J, and −400 mV for a K. The current source must meet the required accuracy starting with the first symbol of a packet. One means of achieving this is to leave the current source on continuously when a transceiver is operating in HS mode. If this approach is used, the current can be directed to the port ground when the transceiver is not transmitting (the example design in FIG. 4 shows a control line called HS-Current-Source-Enable to turn the current on, and another called HS-Drive-Enable to direct the current into the data lines.) The penalty of this approach is the 17.78 mA of standing current for every such enabled transceiver in the system. The preferred design is to fully turn the current source off when the transceiver is not transmitting.

The quiescent state of a transceiver operating in HS mode is with the LS/FS driver held in its Single Ended Zero state (so as to provide the required terminations), and with the HS current source in a state in which the source is active, but the current is being directed into the device ground rather than through the current steering switch which is used for data transmission. Steering the current to ground is accomplished by setting the HS-Drive-Enable low. When a transceiver operating in HS mode begins transmitting, the transmit current is redirected from the device ground to the current steering switch. This switch in turn directs the current to either the Data+ or Data− data line. A J is asserted by directing the current to the Data+ line, a K by directing it to the Data− line.

When each of the data lines is terminated with a 45 Ohm resistor to the device ground, the effective load resistance on each side is 22.5 Ohms. Therefore, the line into which the drive current is being directed rises to 17.78 ma * 22.5 Ohms, or 400 mV (nominal). The other line remains at the device ground voltage. When the current is directed to the opposite line, these voltages are reversed.

An LS/FS Differential Receiver 450 is used for receiving LS and FS data according to the USB 1.0/1.1 specification. Single Ended Receivers 470 also comply with these specifications.

A HS Differential Data Receiver 430 is used to receive HS data, which has a nominal differential amplitude of +/−400 mV. This receiver must have the ability to be disabled by a Transmission Envelope Detector 440 as indicated in FIG. 4. This is a requirement because the quiescent state of a HS link is with the receivers at each end active and with the data lines held at ground. In this condition, the receivers are susceptible to noise or spurious signals, and a means of "squelching" is required. It is left to transceiver designers to choose between incorporating separate HS and LS/FS receivers, as shown in FIG. 4, or combining both functions into a single receiver. The Transmission Envelope Detector 440 is used to disable the HS receiver 440 when the amplitude of the differential signal falls below the minimum required level for data reception. It must have a response time that is sufficient to allow the receiver to recover all but the first four symbols of a packet. The receiver must disable reception when the differential signal amplitude falls below a threshold within the range of 100 mV to 150 mV. (This means that signals with less than 100 mV differential amplitude are required to be disabled, and that signals with greater than 150 mV differential amplitude are required to be enabled.)

A Pull-up Resistor (Rpu) 480 is required only in upstream facing transceivers, and is used to indicate signaling speed capability. When used in a downstream facing port, a HS capable transceiver must be able to operate in LS, FS, or HS signaling modes. When used in an upstream facing port, a transceiver must be capable of operating in FS or HS mode. According to the USB 2.0 specification, an upstream facing HS capable transceiver may not operate in LS signaling mode. Therefore a 1.5 k pull-up resistor 480 on the Data− line is not allowed in a HS capable transceiver. A HS capable device is required to initially attach as a FS device, using the techniques described in the USB 1.1 specification. This means that for HS capable upstream facing ports, Rpu (1.5 k+/−5%) must be connected from Data+ to the 3.3V supply through a switch, which can be opened under SW control. After the initial attachment, HS capable transceivers engage in a low-level protocol to establish a HS link and to indicate HS operation in the appropriate port status register. This protocol involves electrically removing the 1.5 k Ohm resistor 480 from the circuit. In FIG. 4, a control line called Rpu-Enable is indicated for this purpose. The resistor is removed by setting Rpu_Enable low (opening the switch 485). The protocol also involves providing the Data+ and Data− terminations to ground, by setting the Assert-Single-Ended-Zero and the LS/FS-Driver-Output-Enable bits high. The preferred embodiment is to attach matched switching devices to both the Data+ and Data− lines so as to keep the lines' parasitics balanced, even though a pull-up resistor will never be used on the Data− line of an upstream facing HS capable transceiver. Pull-down Resistors (RpD) 495 (15 k+/−5%) are connected from Data+ and Data− to ground only in downstream facing transceivers, and conform to USB 1.1 specifications.

A Disconnection Envelope Detector 460 is used to detect when the amplitude of the differential signal exceeds the maximum allowable data signaling levels. This will occur when a downstream facing transceiver transmits a continuous string of J's or K's for more than the round trip time of the cable and device termination resistors are not present. This is used as an indication of device disconnection. In the absence of the far end terminations, the differential voltage will nominally double (as compared to when a HS device is present) when the current is not switched for a period exceeding the round-trip delay. Because such a string of J's or K's is required as part of the USOF EOP, the Disconnection Envelope Detector is used for detecting disconnection of HS devices as defined in more detail below. A HS capable transceiver of a downstream facing port must indicate device disconnection if the signal amplitude on the data lines exceeds a differential voltage threshold within the range of 500 mV to 600 mV. (This means that signals with less than 500 mV differential amplitude must not cause indication of disconnection, and that signals with greater than 600 mV differential amplitude are required to indicate disconnection.) When no downstream device is attached, the disconnect detection circuitry in the downstream facing transceiver must detect the over-voltage condition in response to a single USOF EOP delimiter.

Overview of the Signaling Voltages the pull-down resistors present there will cause both D+ and D− to be pulled below the single-ended low threshold of the host or hub port when that port is not being driven by the hub. This creates an SE0 state on the downstream port. A disconnect condition ($T_{DDIS}$) is indicated if the host or hub is not driving the data lines and an SE0 persists on a downstream port for more than 2.5 s. A connect condition ($T_{DCNN}$) will be detected when the hub detects that one of the data lines is pulled above its $V_{IH}$ threshold for more than 2.5 s.

The signaling of a connect and disconnect of a function, is as follows for a high-speed device. A downstream facing port operating in HS mode detects disconnection by sensing the increase in the differential signal amplitude across the Data+ and Data− lines that occurs when the device terminations are removed. As shown in FIG. 4, the "Disconnection Envelope Detector" output goes high when the downstream facing transceiver transmits and positive reflections from the open line arrive in a phase which is additive with the transceiver driver signal. To assure that this additive effect occurs reliably and is of sufficient duration to be detected, the USOF EOP delimiter is lengthened compared to the full-speed and low-speed mode. Signals with differential amplitudes >=600 mV must reliably activate the Disconnection Envelope Detector. Signals with differential amplitudes <=500 mV must never activate the Disconnection Envelope Detector. The hub must sample the Disconnection Envelope Detector output at a time

| Bus state | Signaling Levels |
| --- | --- |
| HS Quiescent state | −5 mV <= Data+ <= 5 mV; −5 mV <= Data− <= 5 mV |
| HS J state | 360 mV <= Data+ <= 440 mV; −5 mV <= Data− <= 5 mV |
| HS K state | −5 mV <= Data+ <= 5 mV; 360 mV <= Data− <= 440 mV |
| Squelch threshold | The incoming signal must be disabled when its differential amplitude fails below 100 mV, and enabled when its differential amplitude exceeds 150 mV |
| HS disconnect on downstream facing port | A downstream facing transceiver must indicate disconnection when the it senses a differential amplitude on the Data+ and Data− line of more than 600 mv, and it must not signal disconnection when the voltage is less than 500 mV |
| Start of HS packet | The transmission of a HS packet is initiated by the transition from the HS quiescent state to the HS SYNC pattern |
| End of HS packet | The HS EOP field, described below, is followed by the HS quiescent state |
| HS reset | A hub resets a HS capable device by asserting an extended single-ended zero |

Data Signaling

HS data transmission within a packet is done with differential signals. The quiescent state of the data lines between packets is both lines at GND. The start of a packet (SOP) in HS mode is signaled by driving the Data+ and Data− lines from the HS quiescent state to the K state. This K is the first symbol of the HS SYNC pattern (NRZI sequence KJKJKJKJ KJKJKJKJ KJKJKJKJ KJKJKJKK). The first symbol in the HS EOP (end of a packet) delimiter is a transition from the last symbol prior to the EOP. This opposite symbol becomes the first symbol in the EOP pattern (NRZ 01 1 1 1 1 1 1 1 with bit stuffing disabled). Upon completion of the EOP pattern, the transmitter returns to the quiescent state. The fact that the first symbol in the EOP pattern forces a transition simplifies the process of determining precisely which is the last bit in the packet prior to the EOP delimiter.

Connect and Disconnect Signaling

The signaling of a connect and disconnect of a function, is as follows for a low-speed and full-speed device. When no function is attached to the downstream port of the host or hub, that coincides with the transmission of the 40th bit of the USOF EOP pattern. The detector's output should be ignored at all other times.

When a USB device has been removed from one of a hub's ports, the hub disables the port and provides an indication of device removal to the host. Appropriate USB System Software then handles the removal indication. If the removed USB device is a hub, the USB System Software must handle the removal of both the hub and of all of the USB devices that were previously attached to the system through the hub.

Reset Signalling

A HS capable hub begins the reset process by checking the state of the lines (to determine whether a device is present and indicating LS) and then driving SE0, (Note that the following hub actions will be perceived by a non-HS capable device as a long SE0, and these actions will reset such a device just as a USB 1.1 hub would reset it.) The time at which SE0 is asserted is shown in the following table as T0. If the device indicates LS capability, the hub simply holds the assertion of SE0 until T9, doesn't perform any of the following "listening" behaviors, and reports the port speed as LS. If the hub port does not detect a LS device, it may be attached to a FS device, a HS capable device which is operating in FS mode, a HS capable device operating in HS mode, or no device at all. To differentiate between these possibilities, starting at T3 the hub begins listening for a HS "chirp" from the device. In response to the assertion of a continuous SE0, a HS capable device must first determine whether the hub is telling it to Reset or Suspend. At T1, the device reverts to FS mode (if not already in FS) by disconnecting its HS terminations and reconnecting the D+ pull-up resistor. At T2, 2.5 us later, the device tests the line to determine whether a SE0 or FS J is present. If the line is at an FS J, the device knows that the hub is indicating a Suspend, and the device then continues with the Suspend process which is not described further here. If the line is at SE0, the device knows that the hub is driving the lines to SE0 and may continue with the Reset process. At a time no sooner than T4 a HS capable device must switch off its Data+ pull-up resistor, restore its HS terminations, and transmit a "chirp" which ends no later than T5. This chirp is defined to be a continuous HS K with a duration of at least 8 us. If a hub detects the HS "chirp" before T6 and is not HS disallowed, it begins HS operation no later than T7. A hub detects a chirp if it sees a continuous HS K at its output for at least 2 us. (The 8 us assertion and 2 us detection requirements make HS detection reliable in the presence of occasional noise events of sub-microsecond duration.) The speed of the link is reported as HS. If the hub fails to detect the "chirp", or if it is HS disallowed, it must remain in SE0 at least until T9. The speed of the link is reported as FS. If the device begins receiving HS uSOF's before T8, it must continue to operate in HS mode. If it does not begin receiving HS uSOF's by T8, it must revert to FS operation. Note that by this process, a USB 2.0 hub which resets a port to which nothing is attached will initially report that there is a FS device attached, and immediately thereafter it will detect a disconnection.

step is to enable the FS termination, possibly in addition to the HS termination. Referring to the preferred implementation shown in FIG. 4, this is achieved by the firmware causing the pull-up resistor Rpu 480 on D+ line to be switched on, for instance by setting Rpu_Enable to high. Next, the HS termination is removed. This is achieved by disabling the LS/FS driver 420, for instance by setting the LS/FS_Driver_Output_Enable signal to low. Preferably, also the SE0 drive is switched off (for instance by setting the Assert-Single-Ended-Zero signal of the LS/FS Driver 420 to low). Switching on the pull-up resistor ensures that the termination impedance exceeds the HS termination requirements to that extent that the disconnection envelop detector 460 will signal a disconnect. So, the disconnect detection mechanism in the hub's downstream-facing port will detect a disconnect at the end of the next micro-SOF packet that is propagated from the hub to the device. In fact, the hub's receiver will see a differential signal amplitude exceeding the maximum allowable data signal level, because the parallel termination is off, and the D+ pull-up Rpu 480 is practically equivalent to an open end. Removing the HS termination ensures that the remaining FS termination is suited for the connect process which begins in the FS mode. Once the hub has detected the disconnect, it will report this to the host. Immediately, the port starts to check for a new connect, and will detect a new connect due to D+ pull-up. The hub and the host will process this new connect like any other new connect. The newly connected device will be reset. In the reset process, the device can switch back to HS operation according to the defined algorithm (with chirping process).

Normally the device disconnect emulation according to the invention is implemented in a computer peripheral. Such a peripheral usually includes an embedded microcontroller (or other suitable processor) controlling the communication driver, such as shown in FIG. 4. Consequently, the disconnect and reconnect emulation is performed by the microcontroller

| Timing Parameter | Description | Value |
|---|---|---|
| T0 | Hub asserts SE0 on the data lines | 0 (reference) |
| T1 | Device reverts to FS mode (if not already in FS mode) by connecting D+ pull-up and removing HS terminations | 3 ms |
| T2 | Device tests for SE0 on the wire (FS J would indicate Suspend rather than Reset) | 2.5 us after device reverts to FS |
| T3 | Hub begins listening for HS "chirp" from device | 4.75 ms |
| T4 | Earliest time at which device may disconnect Data+ pull-up resistor, restore HS terminations, and begin transmission of HS "chirp" | 5 ms |
| T5 | Latest time by which device must complete transmission of HS "chirp" | 6 ms |
| T6 | Hub stops listening for HS "chirp" | 6.25 ms |
| T7 | Time by which hub must begin HS operation if HS "chirp" was received | T7 < (End of HS "chirp" + 1 ms) |
| T8 | Time at which device restores Data+ pull-up resistor and reverts to FS operation if no HS uSOF's have been received | (End of HS "chirp" + 3 ms) < T8 < (End of HS "chirp" + 3.5 ms) |
| T9 | Earliest time at which hub may end reset if no HS "chirp" was detected | 10 ms |

According to the invention the following firmware controlled connect and disconnect of a high-speed device is defined to allow a device to trigger the enumeration process of the host. This is done, by going from the HS parallel termination to FS termination, through firmware control. The first under control of suitable program (firmware) to perform the steps according to the invention. This computer program product is usually loaded from a background storage, such as a hard disk or ROM. The computer program product can initially be stored in the background storage after having been distributed on a storage medium, like a CD-ROM, or via a network, like the public Internet.

The invention claimed is:

1. A method of emulating disconnection of a detachable device from a port of a communication bus, the method comprising:
    controlling at least one switch of the detachable device such that prior to emulating disconnection of the detachable device from the communication bus the switch is open, whereby a bus line is terminated according to a first termination state; and
    closing the switch of the detachable device such that the bus line is terminated according to a second termination state;
    disabling a low speed/full speed driver of the detachable device;
    at a hub of the communication bus, determining that the detachable device has been detached from the port of the communications bus in response to the closing and disabling even though the detachable device is still attached to the port of the communication bus;
    in response to the determination that the detachable device has been detached from the communication bus, checking for a connection to the port of the communication bus;
    detecting a connection between the detachable device and the port of the communication bus; and
    resetting the detachable device in response to the detected connection.

2. A method of emulating a detachment of a detachable device from a port of a communication bus, the method comprising:
    controlling at least one switch of the detachable device such that prior to emulating detachment of the detachable device from the port of the communication bus the switch is open, whereby a bus line is terminated according to a first termination state;
    while the detachable device is still attached to the port of the communication bus, closing the switch of the detachable device such that the bus line is terminated according to a second termination state;
    in response to closing the switch, determining that the detachable device has been detached from the port of the communications bus in response to the closing even though the detachable device is still attached to the port of the communication bus;
    in response to determining that the detachable device has been detached from the communications, checking to see if a device is attached to the port of the communication bus;
    detecting that the detachable device is attached to the port of the communication bus; and
    resetting the detachable device in response to the detected attachment.

3. A method of emulating disconnection of a detachable device from a port of a communication bus, the method comprising:
    controlling at least one switch of the detachable device such that prior to emulating disconnection of the detachable device from the port of the communication bus the switch is open, whereby a bus line is terminated according to a first termination state; and
    closing the switch of the detachable device and disabling a low speed/full speed driver of the detachable device such that the bus line is terminated according to a second termination state, thereby triggering the port to:
        determine that the detachable device has been detached from the port even though the detachable device is still attached to the port;
        check to see if a device is attached to the port; and
        initiate a reset process because the detachable device is still attached to the port.

4. The method of claim 1 further comprising, in response to the determination that the detachable device has been detached from the communication bus, reporting to a host of the communication bus that the detachable device has been detached from the communication bus even though the detachable device is still attached to the communication bus.

5. The method of claim 1 wherein resetting the detachable device comprises the hub asserting a single ended zero (SE0) signal.

6. The method of claim 1 wherein resetting the detachable device comprises initiating a Universal Serial Bus (USB) reset protocol.

7. The method of claim 2 further comprising, in response to the determination that the detachable device has been detached from the communication bus, reporting to a host of the communication bus that the detachable device has been detached from the communication bus even though the detachable device is still attached to the communication bus.

8. The method of claim 2 wherein resetting the detachable device comprises the hub asserting a single ended zero (SE0) signal.

9. The method of claim 2 wherein resetting the detachable device comprises initiating a Universal Serial Bus (USB) reset protocol.

* * * * *

UNITED STATES PATENT AND TRADEMARK OFFICE
CERTIFICATE OF CORRECTION

PATENT NO. : 7,500,027 B2  Page 1 of 1
APPLICATION NO. : 10/919756
DATED : March 3, 2009
INVENTOR(S) : Zong Liang Wu It is certified that error appears in the above-identified patent and that said Letters Patent is hereby corrected as shown below:

On the Title Page add:

Item --(63)   Related U.S. Application Data

Continuation of application no. 09/745,856, filed
   on Dec. 22, 2000, now Pat. No. 6,791,950.-- and

Item --(30)   Foreign Application Priority Data

Dec. 24, 1999   (EP) ..........................99204536--

Signed and Sealed this
Seventeenth Day of July, 2012

David J. Kappos
*Director of the United States Patent and Trademark Office*